United States Patent
Liu et al.

(10) Patent No.: US 11,194,392 B2
(45) Date of Patent: Dec. 7, 2021

(54) METHOD OF CALIBRATING EYE-TRACKING APPLICATION AND RELATED OPTICAL SYSTEM

(71) Applicant: Ganzin Technology, Inc., Taipei (TW)

(72) Inventors: Kuan-Ling Liu, Kaohsiung (TW); Liang Fang, Taipei (TW); Po-Jung Chiu, Nantou County (TW); Yi-Heng Wu, Tainan (TW); Ming-Yi Tai, Taichung (TW); Yi-Hsiang Chen, Taipei (TW); Chia-Ming Chang, Taipei (TW); Shao-Yi Chien, Taipei (TW)

(73) Assignee: Ganzin Technology, Inc., Taipei (TW)

( * ) Notice: Subject to any disclaimer, the term of this patent is extended or adjusted under 35 U.S.C. 154(b) by 16 days.

(21) Appl. No.: 16/732,341

(22) Filed: Jan. 1, 2020

(65) Prior Publication Data
US 2020/0218345 A1    Jul. 9, 2020

Related U.S. Application Data

(60) Provisional application No. 62/788,115, filed on Jan. 3, 2019.

(30) Foreign Application Priority Data

Sep. 2, 2019 (TW) ............... 108131528

(51) Int. Cl.
G06F 3/01 (2006.01)
G06T 11/60 (2006.01)

(52) U.S. Cl.
CPC .............. G06F 3/013 (2013.01); G06T 11/60 (2013.01)

(58) Field of Classification Search
None
See application file for complete search history.

(56) References Cited

U.S. PATENT DOCUMENTS

| | | | | |
|---|---|---|---|---|
| 10,278,782 | B2* | 5/2019 | Jarc | A61B 34/71 |
| 10,564,714 | B2* | 2/2020 | Marggraff | G06F 3/0304 |
| 2014/0320817 | A1* | 10/2014 | Kiderman | A61B 3/112 |
| | | | | 351/209 |
| 2017/0344111 | A1* | 11/2017 | Kim | G06K 9/00617 |
| 2018/0008141 | A1* | 1/2018 | Krueger | A61B 5/11 |
| 2018/0227470 | A1* | 8/2018 | Ronngren | G02B 27/0093 |
| 2019/0333480 | A1* | 10/2019 | Lang | G02B 27/017 |
| 2020/0035031 | A1* | 1/2020 | Konings | G02B 27/0172 |
| 2020/0211512 | A1* | 7/2020 | Sztuk | G02B 27/0172 |

FOREIGN PATENT DOCUMENTS

| TW | 201035813 A1 | 10/2010 |
|---|---|---|
| TW | 201901529 A | 1/2019 |

* cited by examiner

*Primary Examiner* — James A Thompson
(74) *Attorney, Agent, or Firm* — Winston Hsu

(57) ABSTRACT

In a calibration process for an eye-tracking application, a calibration mark is displayed on an instrument, and the user is instructed to keep the gaze focused on the calibration mark. Next, a dynamic image is displayed on the instrument, and the user is instructed to move his head or the instrument as indicated by the dynamic image while keeping the gaze focused on the calibration mark. The ocular information of the user is recorded during the head movement or the instrument movement for calibrating the eye-tracking application.

18 Claims, 12 Drawing Sheets

METHOD OF CALIBRATING EYE-TRACKING APPLICATION AND RELATED OPTICAL SYSTEM

CROSS REFERENCE TO RELATED APPLICATIONS

This application claims priority of U.S. provisional Application No. 62/788,115 filed on 2019 Jan. 3 and Taiwan Application No. 108131528 filed on 2019 Sep. 2.

BACKGROUND OF THE INVENTION

1. Field of the Invention

The present invention is related to a method of calibrating an eye-tracking application and a related optical system, and more particularly, to a method of calibrating an eye-tracking application with high accuracy and a related optical system.

2. Description of the Prior Art

Virtual reality (VR) is an interactive computer-generated experience taking place within a simulated environment, that incorporates mainly auditory and visual, but also other types of sensory feedback like haptic. Augmented reality (AR) provides an interactive experience of a real-world environment where the objects that reside in the real world are enhanced by computer-generated perceptual information. Mixed reality (MR) is the merging of real and virtual worlds to produce new environments and visualizations, where physical and digital objects co-exist and interact in real time.

Most of existing VR/AR/MR applications are controlled by user hands using joysticks or touch screens, but the burden of carry these control devices may cause inconvenience. By incorporating eye-tracking capabilities into VR/AR/MR headsets, the user can use the eyes as an operational interface, wherein various visual elements can trigger certain responses and behaviors. To benefit from eye-tracking technology in a virtual world, the calibration procedure is essential for accurately capturing the visual information of the user.

A standard calibration set for an eye-tracking application includes multiple calibration marks, and the user is instructed to focus his or her gaze on each calibration mark for data collection. The simplest calibration model takes into five calibration marks, normally four in the corners and one in the center. In order to enhance the accuracy of the calibration procedure, the user is requested to keep the head in a steady position during the entire calibration procedure. However, if the user unconsciously moves the head when gazing at different objects, the reduced field-of-view (FoV) may lower the accuracy of the calibration procedure. The use of a chin support can improve the accuracy of the calibration procedure by guaranteeing a steady head position, but at the cost of extra inconvenience. Another solution is to design a wider FoV with more calibration marks, such as by using a large-sized screen, putting up a large poster printed with calibration marks, or directly drawing wide-range calibration marks in the VR environment. However, not all venues of eye-tracking application can provide a wider FoV.

SUMMARY OF THE INVENTION

The present invention provides a method of calibrating an eye-tracking application. The method includes displaying a calibration mark on an instrument and instructing a user to keep the gaze focused on the calibration mark, providing a movement message, instructing the user to move a head of the user or move the instrument as indicated by the movement message while keeping the gaze focused on the calibration mark, recording an ocular information of the user when the user is moving the head of the user or moving the instrument, and calibrating the eye-tracking application according to the ocular information of the user.

The present invention also provides an optical system which includes an instrument, an eye-tracking module and a controller. A calibration mark is displayed on the instrument. The eye-tracking module includes at least one left-eye camera, at least one right-eye camera and a processor. The at least one left-eye camera and at least one right-eye camera are configured to record an ocular information of a user. The processor is configured to instruct the at least one left-eye camera and the least one right-eye camera to record an ocular information of the user when the user is moving a head of the user or the instrument, and calibrate an eye-tracking application according to the ocular information of the user. The controller is configured to control the eye-tracking application by instruct the user to keep a gaze focused on the calibration mark, provide a movement message, and instruct the user to move a head or move the instrument as indicated by the movement message while keeping the gaze focused on the calibration mark.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
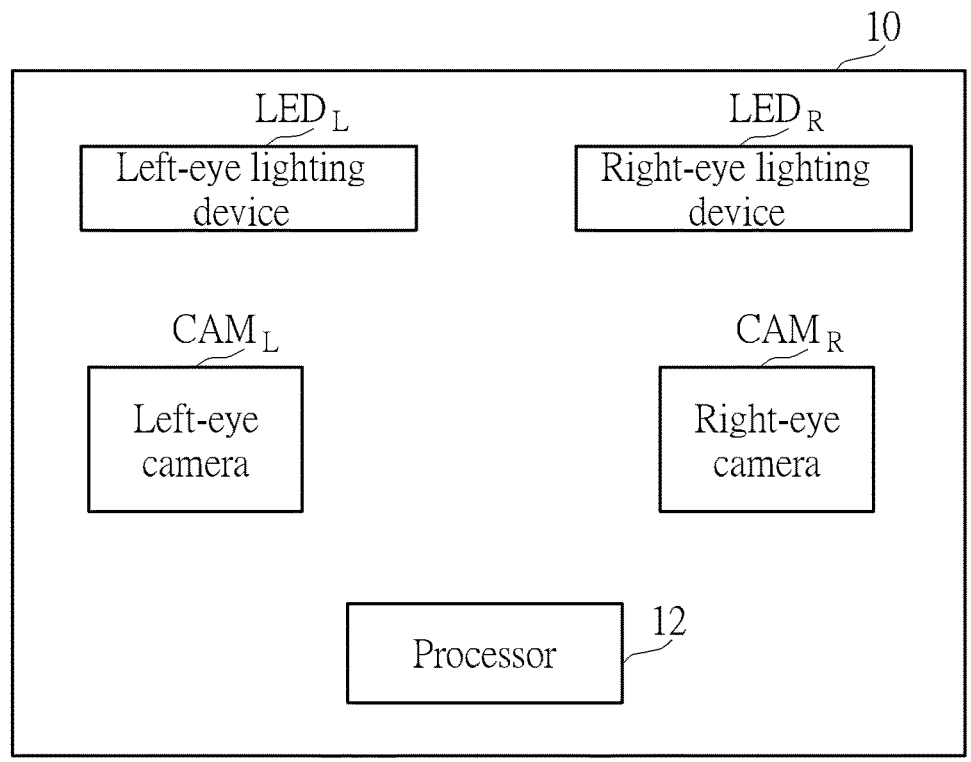
FIG. 1 is a functional diagram of an eye-tracking module according to an embodiment of the present invention.

FIG. 1 is a functional diagram of an eye-tracking module 10 according to an embodiment of the present invention. The eye-tracking module 10 includes a left-eye camera $CAM_L$, a right-eye camera $CAM_R$, a left-eye lighting device $LED_L$, a right-eye lighting device $LED_R$, and a processor 12. The left-eye camera $CAM_L$ is configured to record the left-eye movement of a user. The right-eye camera $CAM_R$ is configured to record the right-eye movement of the user. In an environment with insufficient luminance, the left-eye lighting device $LED_L$ and the right-eye lighting device $LED_R$ may provide the left-eye camera $CAM_L$ and the right-eye camera $CAM_R$ with light for capturing the eye movement of the user. In an environment with sufficient luminance, the eye-tracking module 10 may deactivate the left-eye lighting device $LED_L$ and the right-eye lighting device $LED_R$ for power-saving purpose. The processor 12 may be implemented as a small-size low-power Application-specific integrated circuit (ASIC), a digital signal processor (DSP), or a field programmable gate array (FPGA) capable of analyzing the eye movement of the user according to the data recorded by the left-eye camera $CAM_L$ and the right-eye camera $CAM_R$. In another embodiment of the present invention, the processor 12 may be software running on any device with computing capability.

Figure 2:
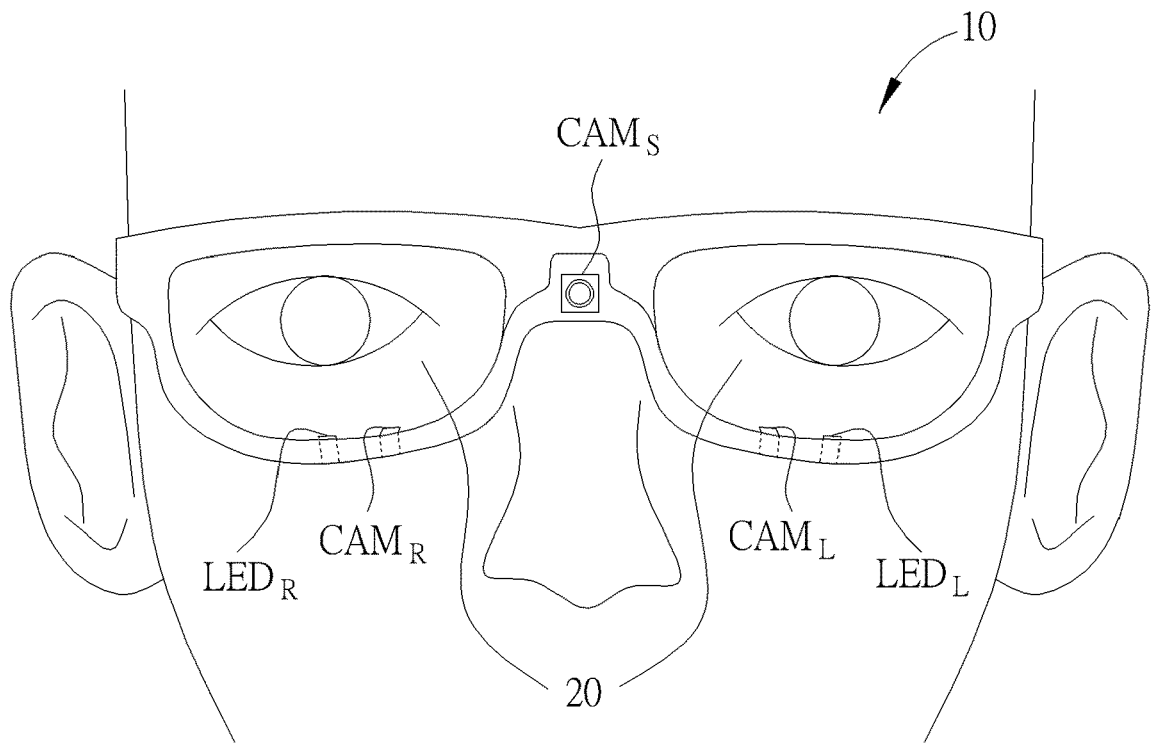
FIG. 2 is a diagram illustrating an implementation of an eye-tracking module according to an embodiment of the present invention.

FIG. 2 is a diagram illustrating the implementation of the eye-tracking module 10 according to an embodiment of the present invention. The eye-tracking module 10 may be implemented as a pair of eyeglasses, wherein the lens of the left-eye camera $CAM_L$ and the emission surface of the left-eye lighting device $LED_L$ faces the left eye of the user. The lens of the right-eye camera $CAM_R$ and the emission surface of the right-eye lighting device $LED_R$ faces the right eye of the user. In this embodiment, the eye-tracking module 10 may further adopt an additional scene camera $CAM_S$ which is disposed in a way to face the same direction as the gaze direction of the user and configured to record the image associated with the FoV of the user. In another embodiment, the eye-tracking module 10 may also be implemented on a head-mounted display device, such as a VR/AR/MR headset. The processor 12 may be a hardware unit embedded in the material of the spectacle frame of the glass-type device, embedded in the head-mounted display device or embedded in a computing device connecting with the glass-type device or the head-mounted display device where the eye-tracking module 10 is implemented, and is thus not depicted in FIG. 2. In another embodiment, the processor 12 may be software running on the glass-type device, the head-mounted display device, or the computing device connecting with the glass-type device or the head-mounted display device.

Figure 3:
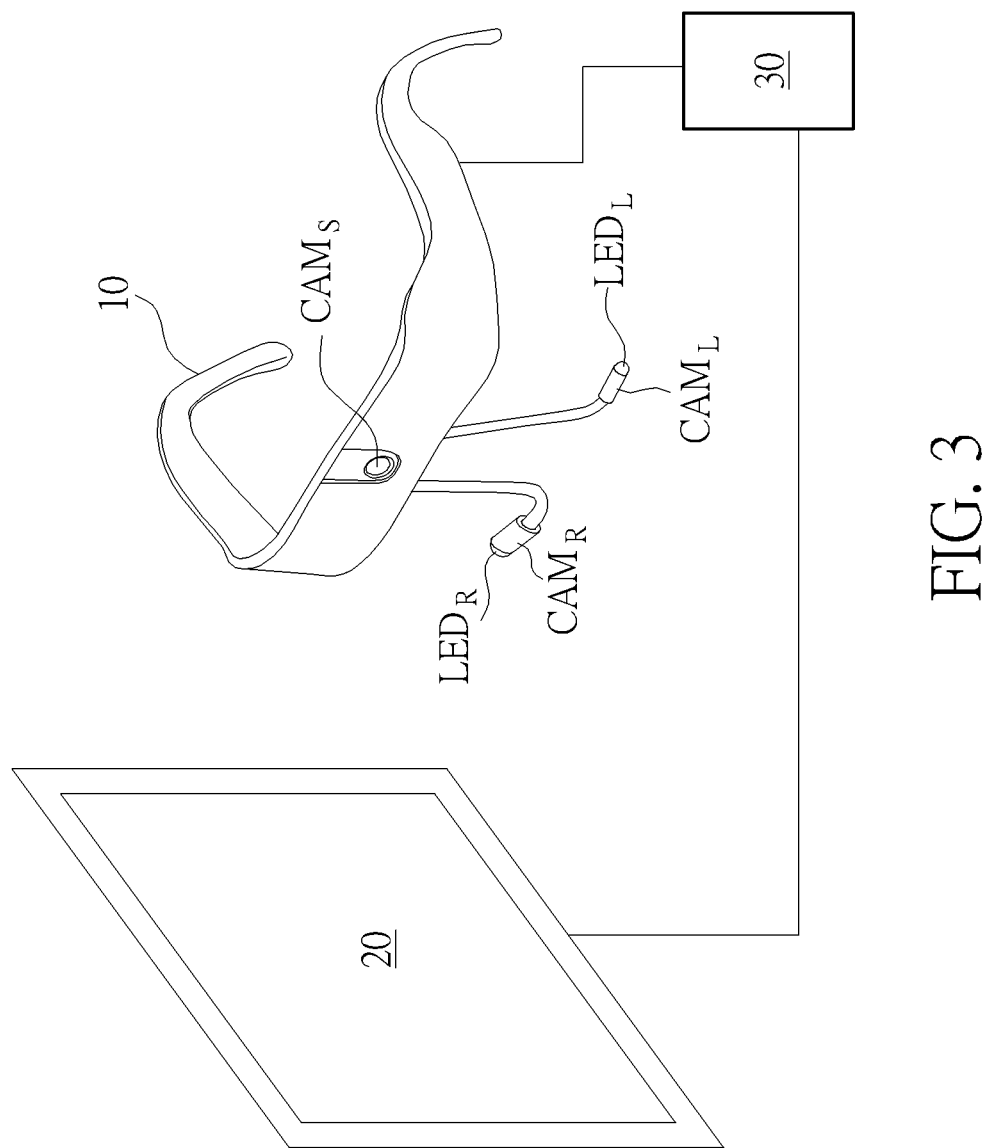
FIG. 3 is a diagram illustrating an optical system including an eye-tracking module and an instrument according to an embodiment of the present invention.

FIG. 3 is a diagram illustrating an optical system including the eye-tracking module 10, an instrument 20, and a controller 30 according to an embodiment of the present invention. In the embodiment when the eye-tracking module 10 is implemented on a head-mounted display device (such as VR/AR/MR headset or smart glasses), the instrument 20 may be the screen provided by the head-mounted display device, and the controller 30 may be a process unit embedded in the head-mounted display device. In another embodiment when the eye-tracking module 10 is implemented on any glass-type device, the instrument 20 may be the screen on a device with computing capability such as a tablet computer, a laptop computer, a desktop computer or a smartphone, and the controller 30 may be a process unit embedded in the computing device. In yet another embodiment when the eye-tracking module 10 is implemented on any glass-type device, the instrument 20 may be any display surface (such as a cardboard), and the controller 30 may be a process unit embedded in the glass-type device, or in any other devices with computing capability such as a tablet computer, a laptop computer, a desktop computer or a smart phone.

In the embodiment depicts in FIG. 2 and FIG. 3, the optical system may further comprise a scene camera $CAM_S$ which is disposed in a way to face the same direction as the gaze direction of the user and configured to record the image associated with the FoV of the user. The scene camera CAMS may be a camera embedded in the glass-type device or the head-mounted display device where the eye-tracking module 10 is implemented, and may be controlled by the controller 30.

Figure 4:
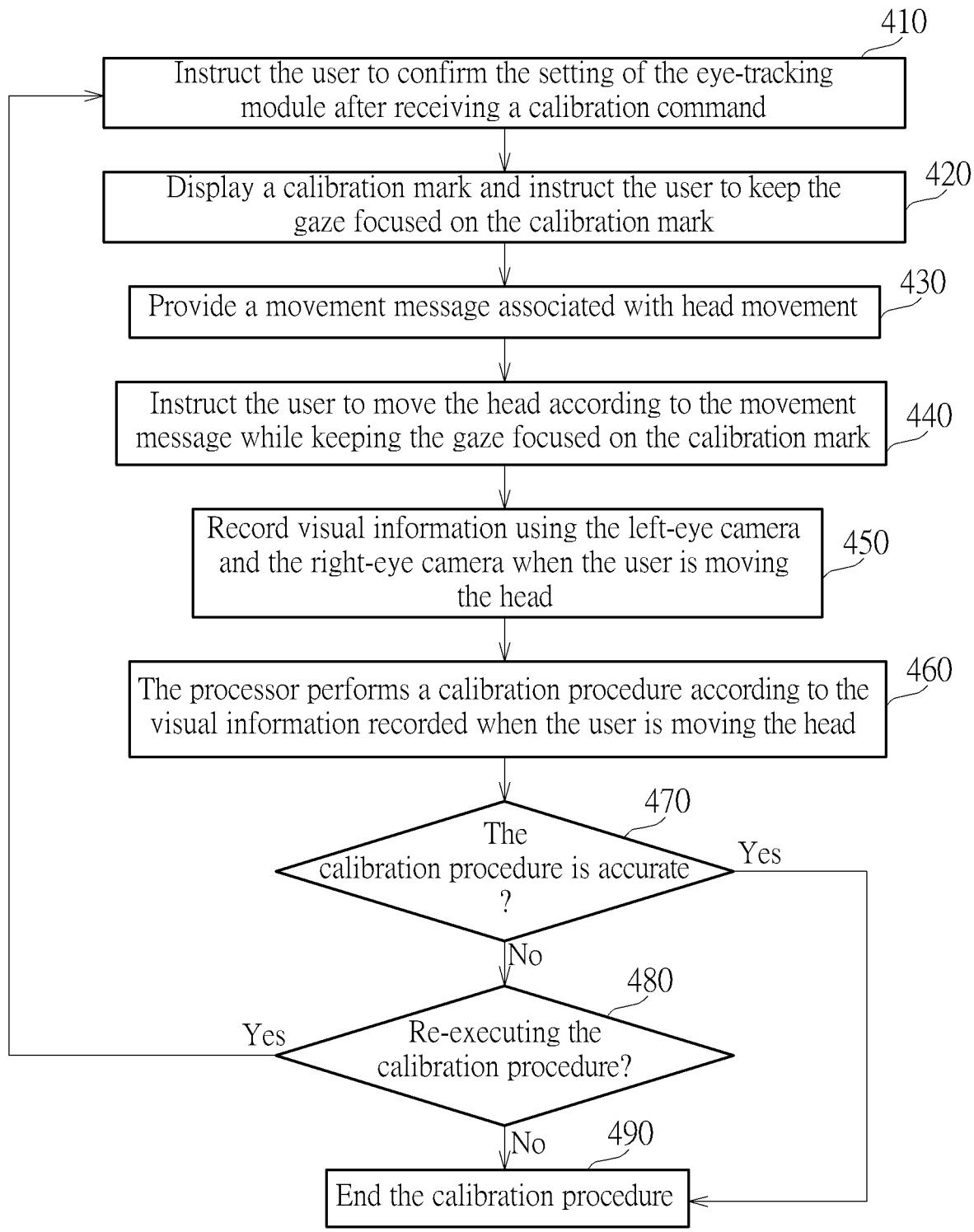
FIG. 4 is a flowchart illustrating the calibration operation of an eye-tracking module according to an embodiment of the present invention.

FIG. 4 is a flowchart illustrating the calibration operation of the eye-tracking module 10 according to an embodiment of the present invention. The flowchart in FIG. 4 includes the following steps:

Step 410: instruct the user to confirm the setting of the eye-tracking module 10 after receiving a calibration command; execute step 420.

Step 420: display a calibration mark and instruct the user to keep the gaze focused on the calibration mark; execute step 430.

Step 430: provide a movement message associated with head movement; execute step 440.

Step 440: instruct the user to move the head according to the movement message while keeping the gaze focused on the calibration mark; execute step 450.

Step 450: record visual information using the left-eye camera $CAM_L$ and the right-eye camera $CAM_R$ when the user is moving the head; execute step 450.

Step 460: the processor 12 performs a calibration procedure according to the visual information recorded when the user is moving the head; execute step 470.

Step 470: the controller 30 determines whether the calibration procedure is accurate according to the calibration information provided by the processor 12; if yes, execute step 490; if no, execute step 480.

Step 480: inquire the user about whether the calibration procedure should be re-executed; if yes, execute step 410; if no, execute step 490.

Step 490: end the calibration procedure.

In the embodiment of implementing the eye-tracking module 10 on a head-mounted display (such as a VR/AR/MR headset or smart glasses), the user may be instructed to confirm that the power of the eye-tracking module 10 is turned on, that the eye-tracking module 10 has been properly put on, and that the brightness of the screen has be adjusted to an appropriate value in step 410. In the embodiment of implementing the eye-tracking module 10 on any glass-type device, the user may be instructed to confirm that the power of the eye-tracking module 10 is turned on, that the eye-tracking module 10 has been properly put on, that the eye-tracking module 10 has established connection with a display device such as a tablet computer, a laptop computer or a smartphone, that the brightness of the screen on the display device has be adjusted to an appropriate value, and that the screen of the display device is located at an appropriate distance from user eyes in step 410. In the embodiment of implementing the eye-tracking module 10 on any glass-type device and a display surface, the user may be instructed to confirm that the display surface is located at an appropriate distance from the eyes of the user in step 410.

Figure 5A:
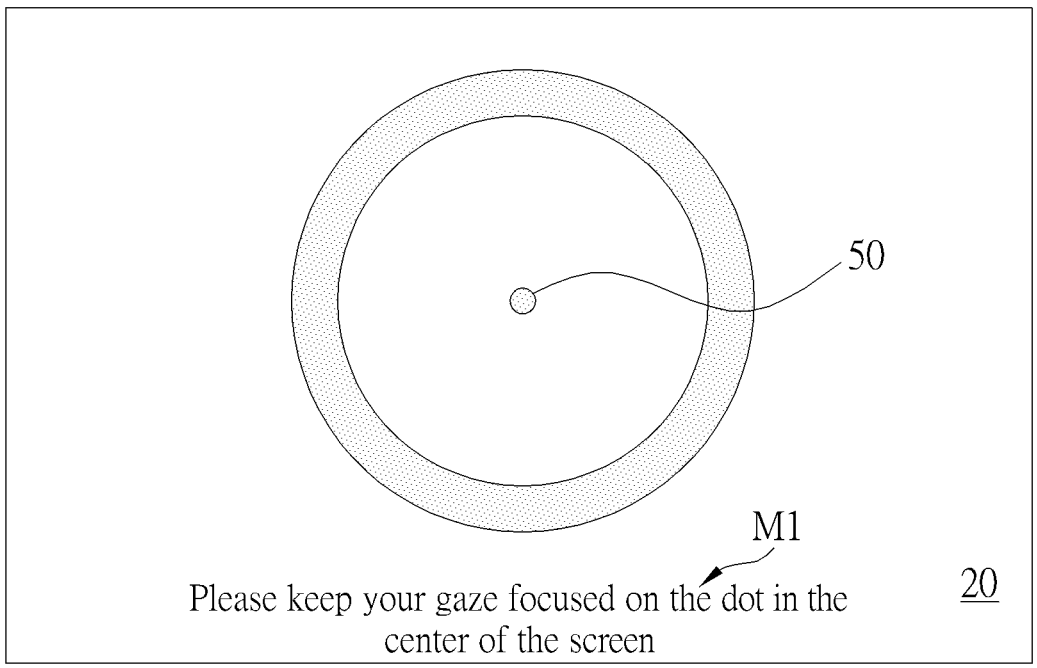
FIGS. 5A-5F are diagrams illustrating the operation of an eye-tracking module according to an embodiment of the present invention.
Figure 5B:
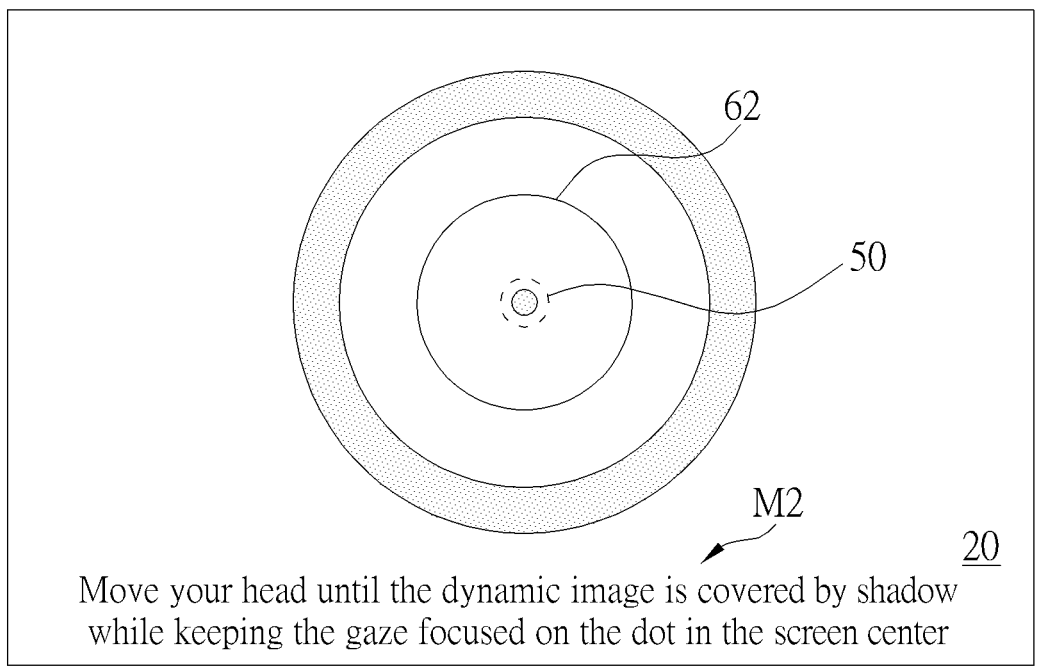
Figure 5C:
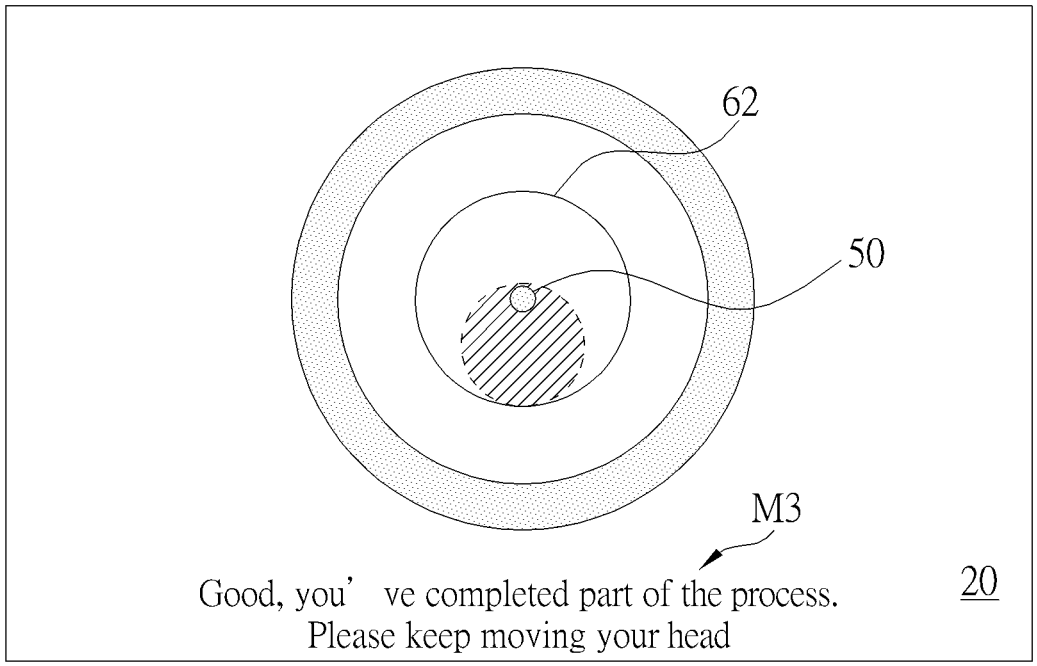
Figure 5D:
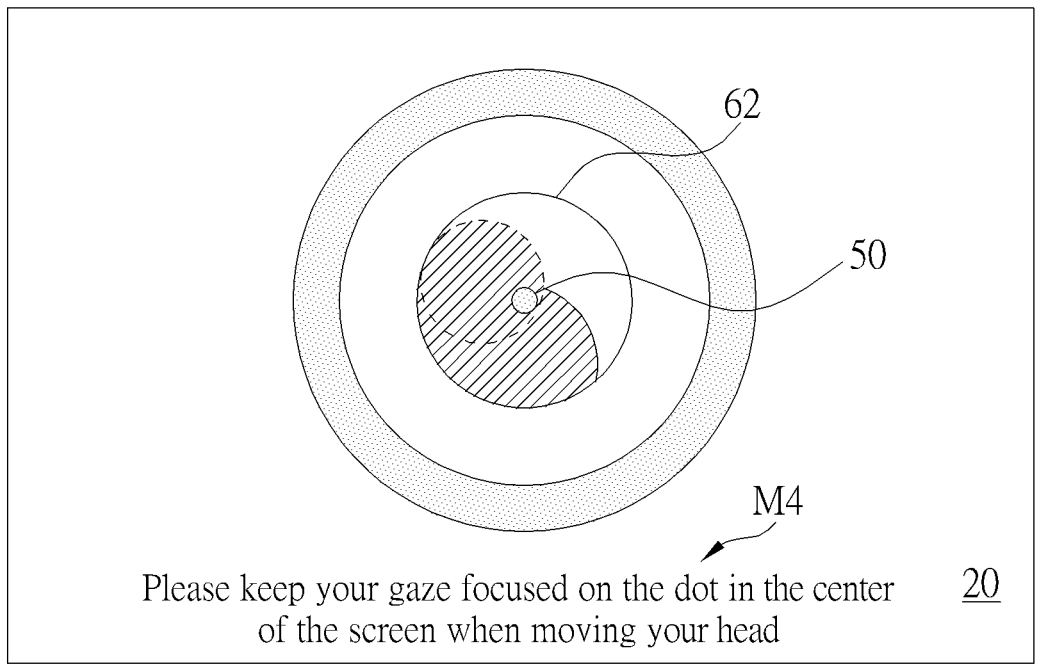
Figure 5E:
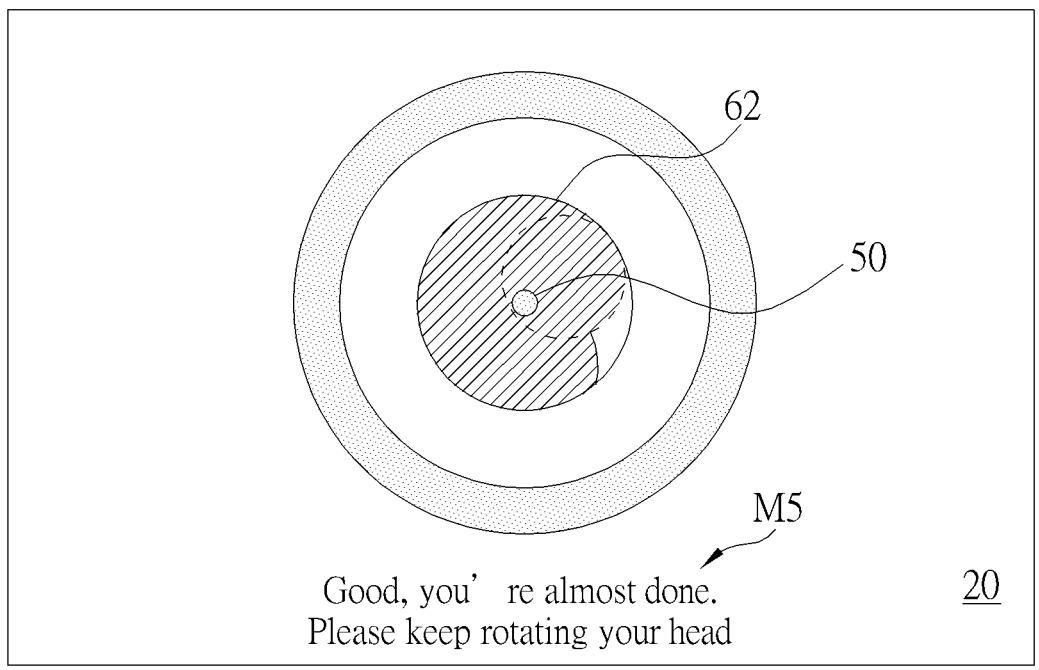
Figure 5F:
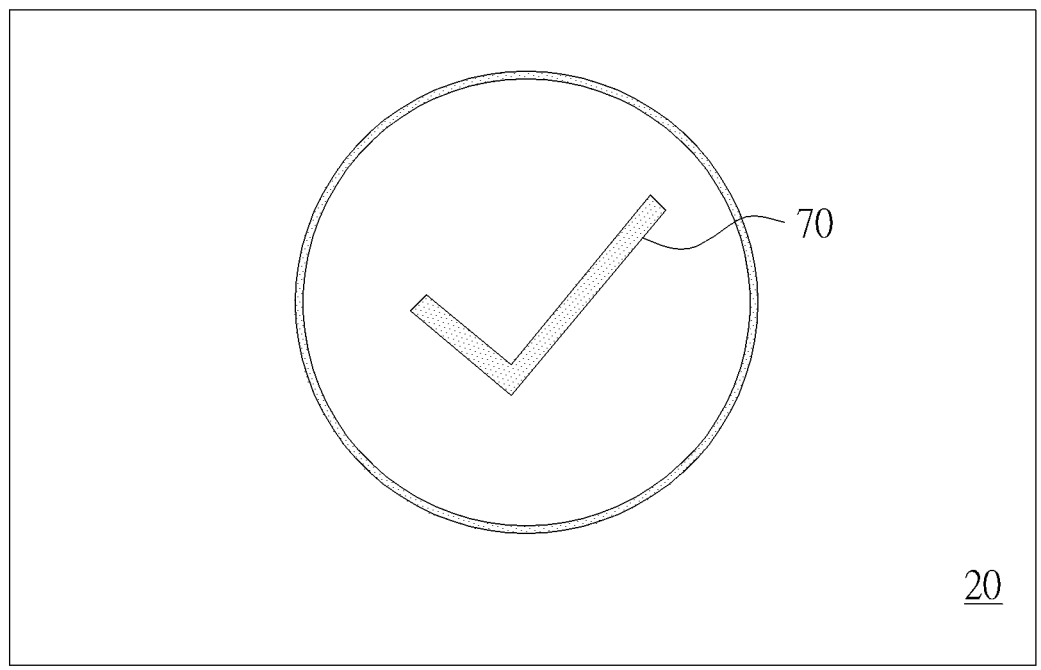

FIGS. 5A-5F are diagrams illustrating the operation of the eye-tracking module 10 when executing steps 420-440 according to another embodiment of the present invention. As depicted in FIG. 5A, a calibration mark 50 may be displayed on the center of an instrument 20 which may be a screen of a VR/AR/MR headset, a screen of a display device (such as a tablet computer, a laptop computer or a smartphone), or a display surface (such as a cardboard). Also, a message M1 may be displayed on the instrument 20 for instructing the user to keep the gaze focused on the calibration mark 50. As depicted in FIG. 5B, the movement message may be provided by displaying a dynamic image 62 associated with the head movement of the user around the calibration mark 50, and a message M2 may be displayed on the instrument 20 for instructing the user to move the head until all area of the dynamic image 62 is covered by shadow while keeping the gaze focused on the calibration mark 50. As depicted in FIGS. 5C-5E, when the user is moving the head, the dynamic image 62 and the messages M3-M5 on the instrument 20 also change accordingly so as to inform the user of the current status of the calibration procedure and to remind the user of keeping the gaze focused on the calibration mark. As depicted in FIG. 5F, after the range of user head movement has resulted in a sufficient shadow area on the dynamic image 62, an image 70 indicating the completion of the calibration procedure may be displayed on the instrument 20. In the embodiment depicted in FIGS. 5A-5F, the calibration mark 50 is a dot, and the dynamic image 62 is a circular image which includes a first region and a second region. The first region presented in a first method corresponds to an uncompleted range of head movement, and the second region presented in a second method corresponds to a completed range of head movement. As the user continues to move the head, the area of the second region in the dynamic image increases and the area of the first region in the dynamic image is gradually reduced to zero. For example, the first method and the second method may be using different colors or different effects (density, brightness, shadow, halo, soft edge or emboss). For illustrative purpose, the first region presented in the first method (corresponding to an uncompleted range of head movement) is designated by blank background, while the second region presented in the second method (corresponding to a completed range of head movement) are designated by striped background. In other words, the larger the range of head movement is completed, the larger area of the dynamic image 62 is filled in the visual perception of the user. However, the method of presenting or changing the dynamic image 62 does not limit the scope of the present invention.

In another embodiment of the present invention, the dynamic image 62 may be a circular image which includes 8 equal-sized fan-shaped regions each corresponding to a 45-degree head rotation. Each fan-shaped region is presented in a first method initially. After the user has completed the head rotation associated with a specific fan-shaped region, the specific fan-shaped region of the dynamic image 62 is then presented in a second method indicating the complete range of head movement. In another embodiment, the dynamic image 62 may include a plurality of bubble patterns around the calibration mark 50. The bubble patterns are presented in the first method (such as normal appearance) initially. As the user moves their head, the bubble patterns in the same direction also move and are "knocked" out of the instrument 20, in which the bubble patterns are presented in a second method (such as disappearing). However, the method of presenting or changing the dynamic image 62 does not limit the scope of the present invention.

Figure 6A:
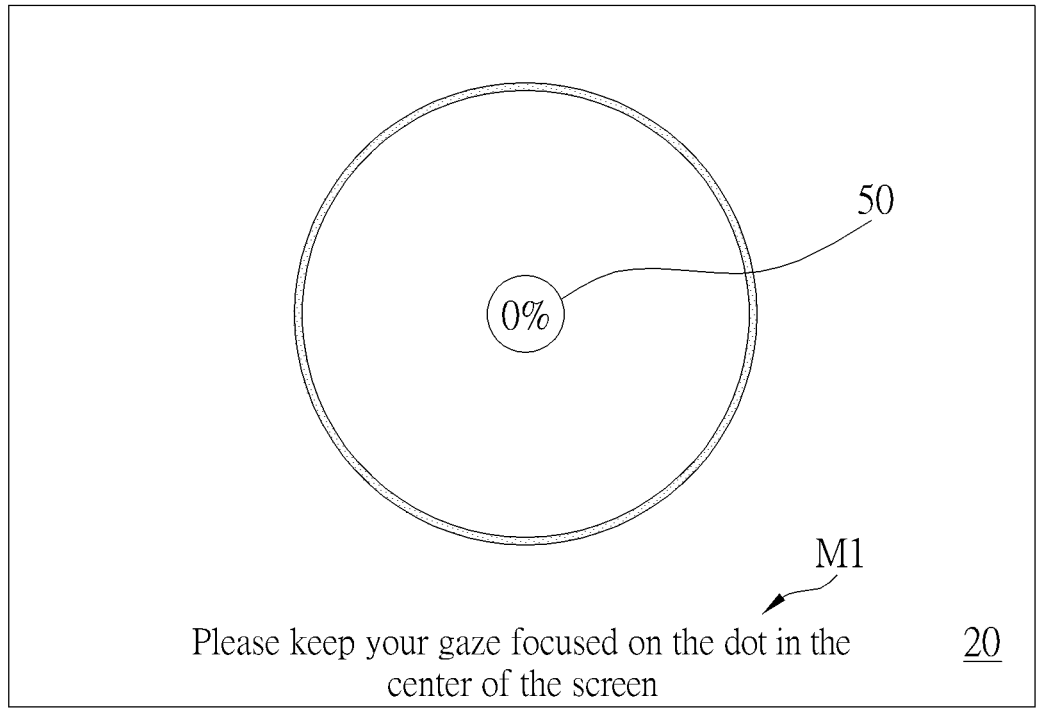
FIGS. 6A-6F are diagrams illustrating the operation of an eye-tracking module according to another embodiment of the present invention.
Figure 6B:
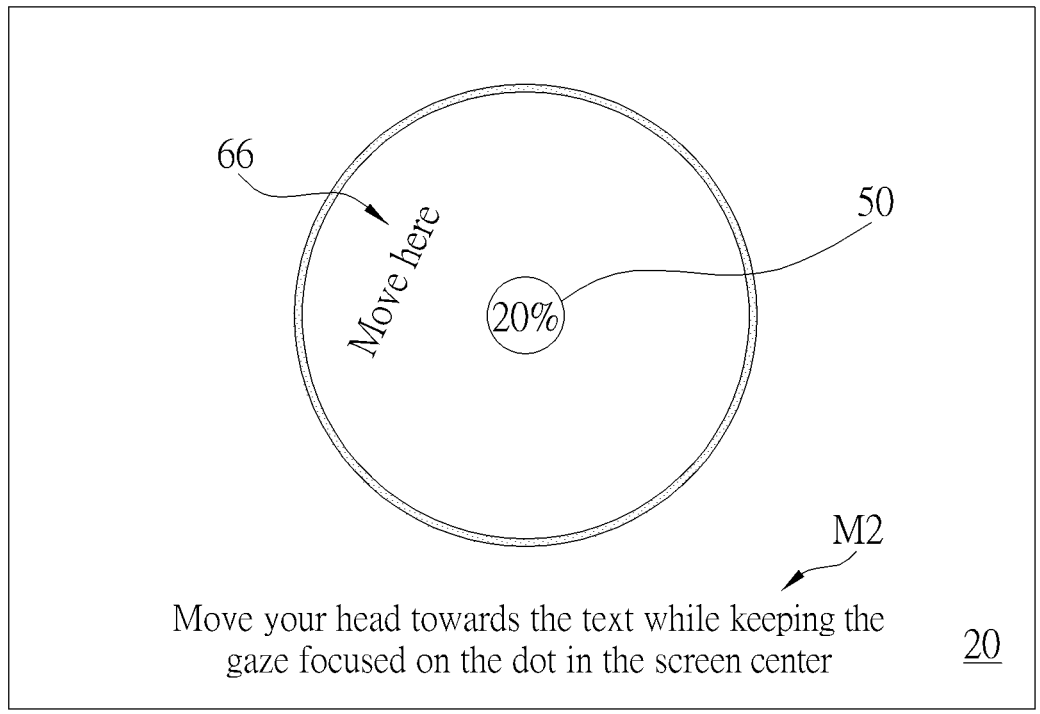
Figure 6C:
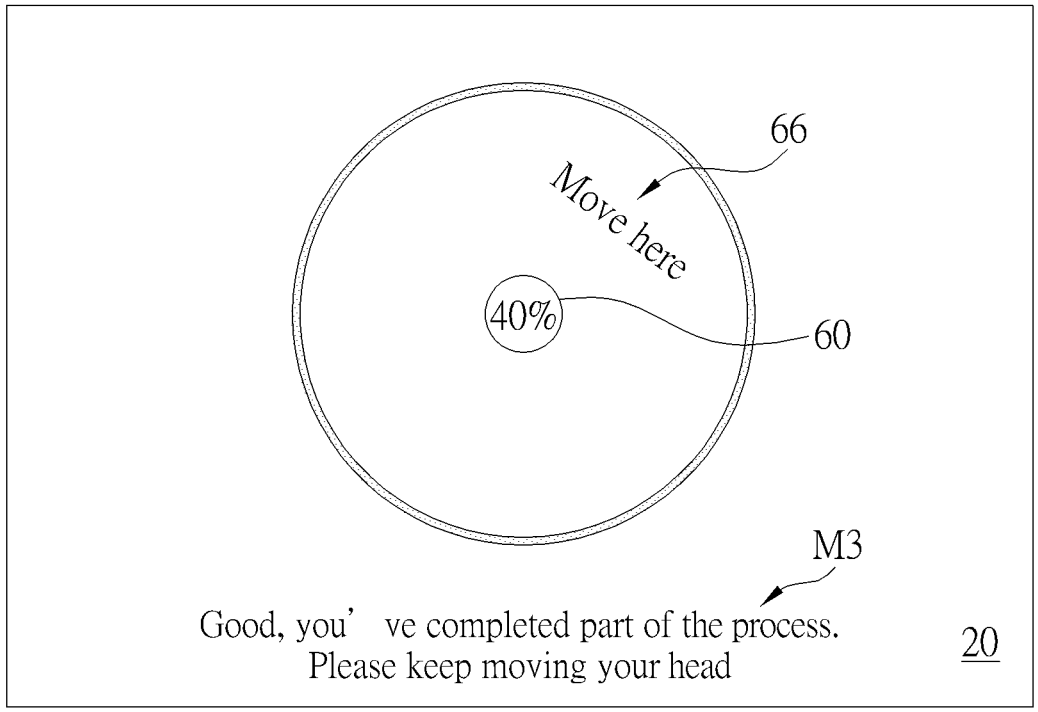
Figure 6D:
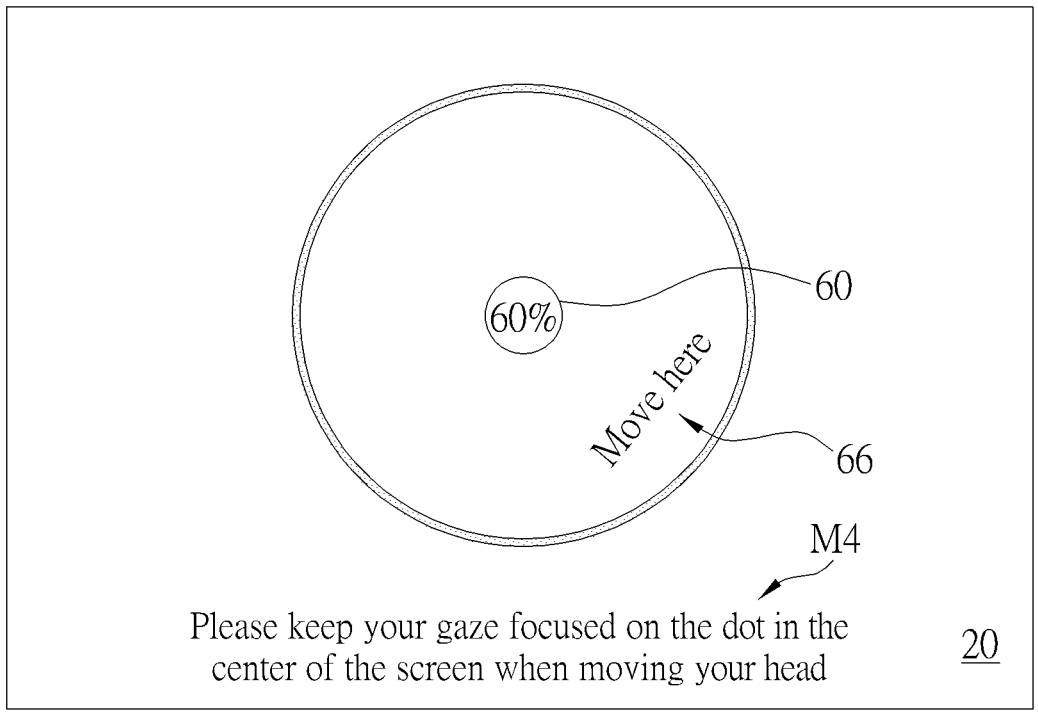
Figure 6E:
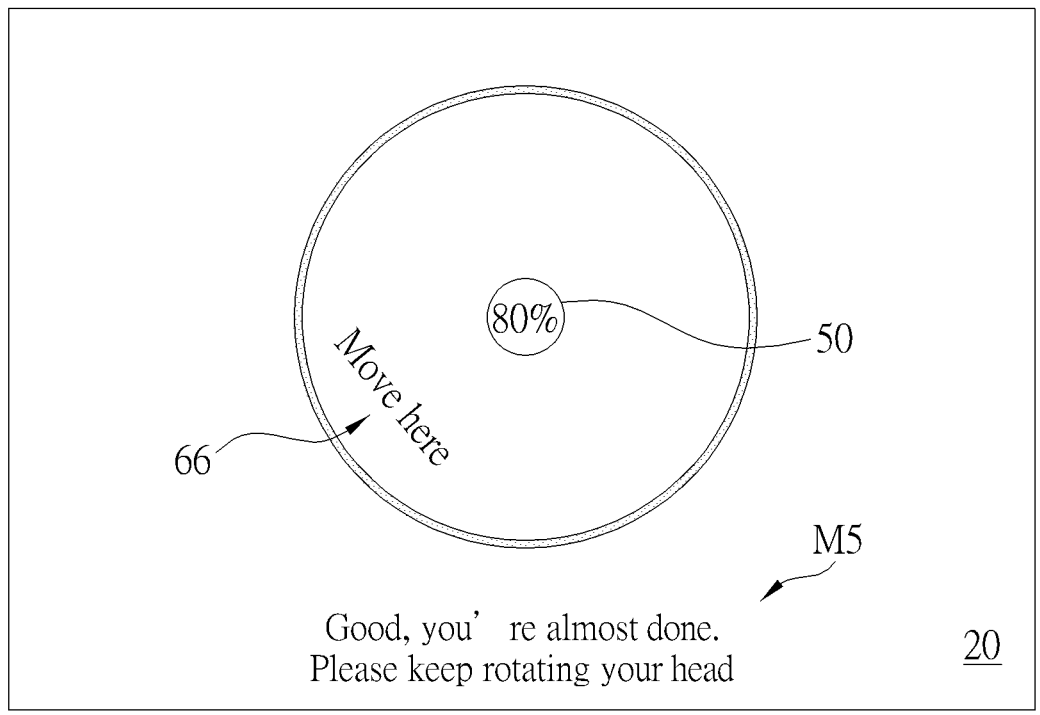
Figure 6F:
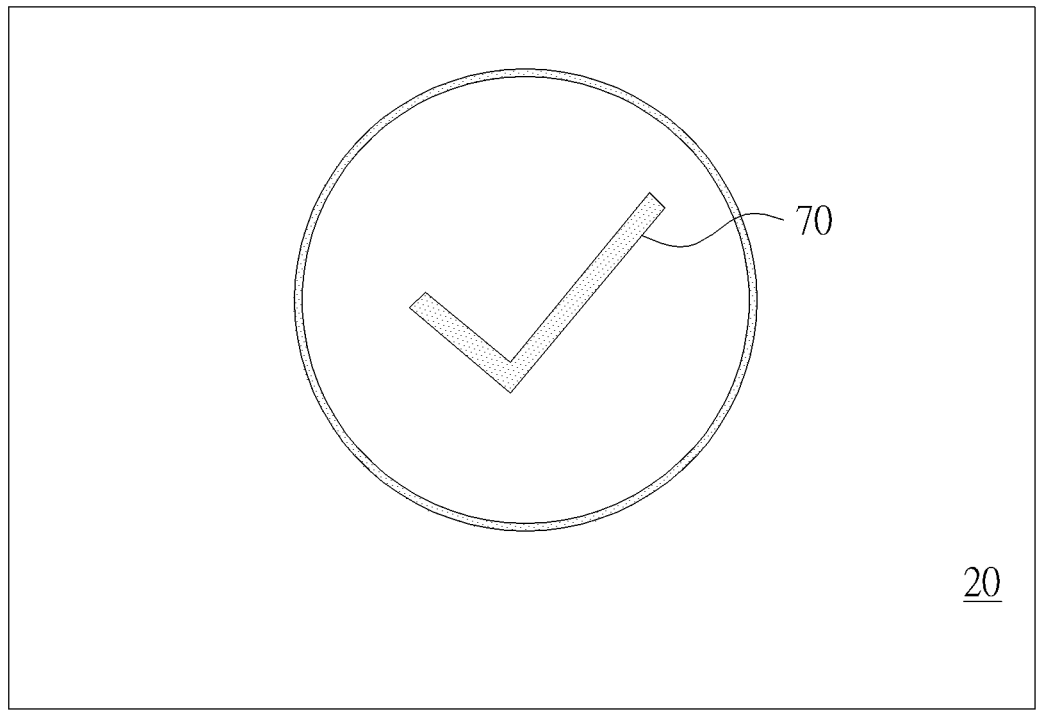

FIGS. 6A-6F are diagrams illustrating the operation of the eye-tracking module 10 when executing steps 420-440 according to another embodiment of the present invention. As depicted in FIG. 6A, a calibration mark 50 containing status information may be displayed on the center of the instrument 20, and a message M1 may be displayed on the instrument 20 for instructing the user to keep the gaze focused on the calibration mark 50. As depicted in FIG. 6B, the movement message may be provided by displaying a text 66 associated with the head position of the user around the calibration mark 50, and a message M2 may be displayed on the instrument 20 for instructing the user to move the head as indicated by the text 66 while keeping the gaze focused on the calibration mark 50. As depicted in FIGS. 6C-6E, when the user moves the head towards the direction indicated by the text 66, the status information on the calibration mark 50 and the messages M3-M5 on the instrument 20 also change accordingly so as to inform the user of the current status of the calibration procedure and to remind the user of keeping the gaze focused on the calibration mark 50. As depicted in FIG. 6F, after the user completes the head positions indicated by the text 66 at all locations, an image 70 indicating the completion of the calibration procedure may be displayed on the instrument 20. In the embodiment depicted in FIGS. 6A-6F, the calibration mark 50 contains the status information using a percentage in number. In another embodiment, the calibration mark 50 may present the current status of the calibration procedure by changing its shape, blinking or changing its color. However, the method of presenting the status information on the calibration mark 50 does not limit the scope of the present invention.

In the embodiments depicted in FIGS. 5A-5F and 6A-6F, the messages M1-M5, the text 66, the status information and the image 70 indicating the completion of the calibration procedure are text or video messages on the instrument 20 which may be a screen of a VR/AR/MR headset, a tablet computer, a laptop computer or a smartphone. In these cases, the messages M1-M5, the text 66, the status information and the image 70 indicating the completion of the calibration procedure may also be presented acoustically by using a voice generator, which may be presented alone or accompanied with the visual information. In another embodiment when the instrument 20 is a display surface on which the calibration mark may be printed or projected, the contents of the messages M1-M5, the text 66, the status information and the completion of the calibration procedure may be acoustically presented, such as using a voice generator.

Figure 7:
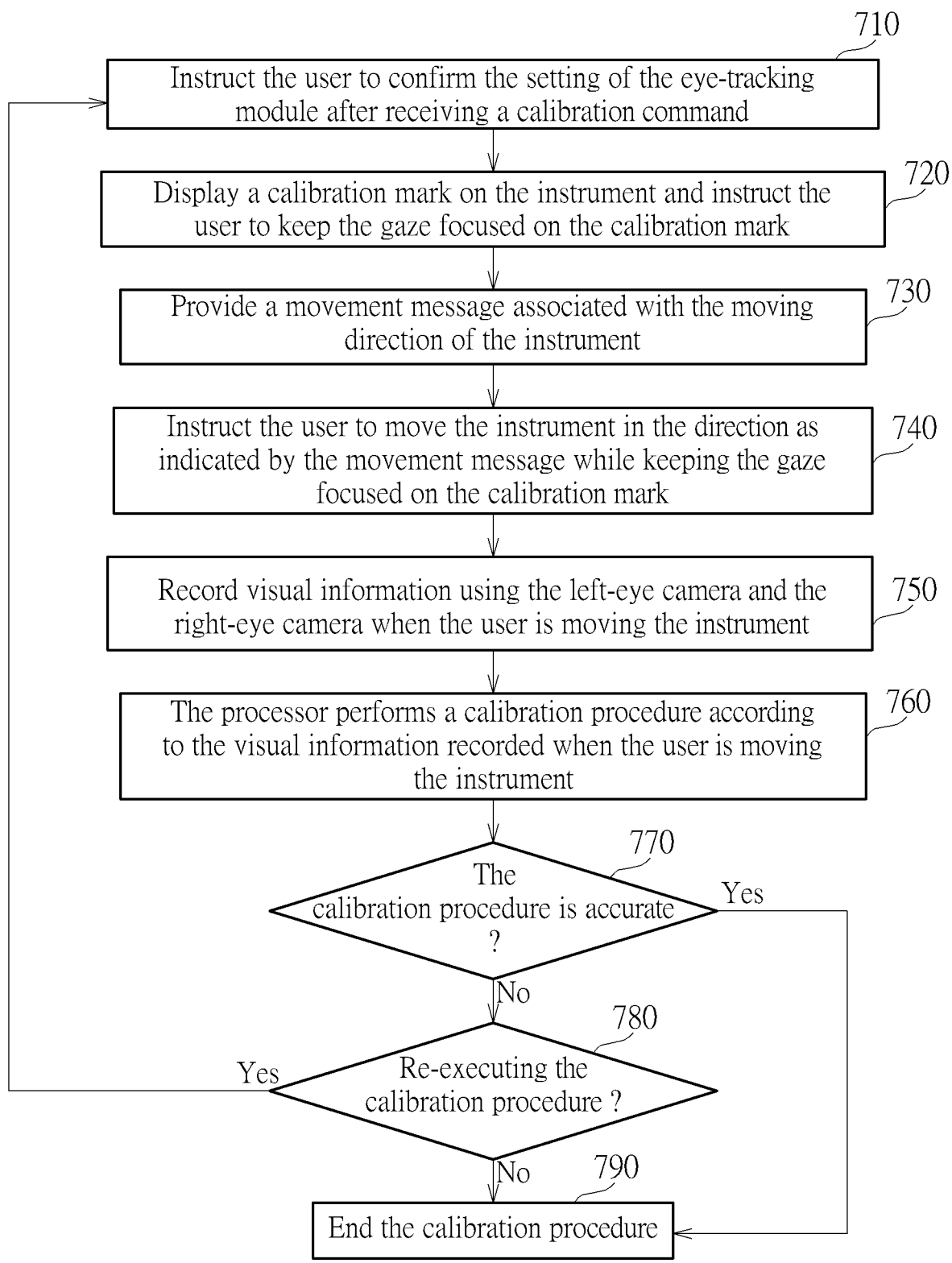
FIG. 7 is a flowchart illustrating the calibration operation of an eye-tracking module according to another embodiment of the present invention.

FIG. 7 is a flowchart illustrating the calibration operation of the eye-tracking module 10 according to another embodiment of the present invention. The flowchart in FIG. 7 includes the following steps:

Step 710: instruct the user to confirm the setting of the eye-tracking module 10 after receiving a calibration command; execute step 720.

Step 720: display a calibration mark on the instrument 20 and instruct the user to keep the gaze focused on the calibration mark; execute step 730.

Step 730: provide a movement message associated with the moving direction of the instrument 20; execute step 740.

Step 740: instruct the user to move the instrument 20 in the direction as indicated by the movement message while keeping the gaze focused on the calibration mark; execute step 750.

Step 750: record visual information using the left-eye camera $CAM_L$ and the right-eye camera $CAM_R$ when the user is moving the instrument 20; execute step 760.

Step 760: the processor 12 performs a calibration procedure according to the visual information recorded when the user is moving the instrument 20; execute step 770.

Step 770: the controller 30 determines whether the calibration procedure is accurate; if yes, execute step 790; if no, execute step 780.

Step 780: inquire the user about whether the calibration procedure should be re-executed; if yes, execute step 710; if no, execute step 790.

Step 790: end the calibration procedure.

In the embodiment of implementing the eye-tracking module 10 on a head-mounted display device such as a VR/AR/MR headset, the user may be instructed to confirm that the power of the eye-tracking module 10 is turned on, that the eye-tracking module 10 has been properly put on, and that the brightness of the screen has be adjusted to an appropriate value in step 710. In the embodiment of implementing the eye-tracking module 10 on any glass-type device, the user may be instructed to confirm that the power of the eye-tracking module 10 is turned on, that the eye-tracking module 10 has been properly put on, that the eye-tracking module 10 has established connection with a display device such as a tablet computer, a laptop computer or a smartphone, that the brightness of the screen on the display device has be adjusted to an appropriate value, and that the screen of the display device is located at an appropriate distance from user eyes in step 710. In the embodiment of implementing the eye-tracking module 10 on any glass-type device and a display surface, the user may be instructed to confirm that the display surface is located at an appropriate distance from the eyes of the user in step 710.

Figure 8A:
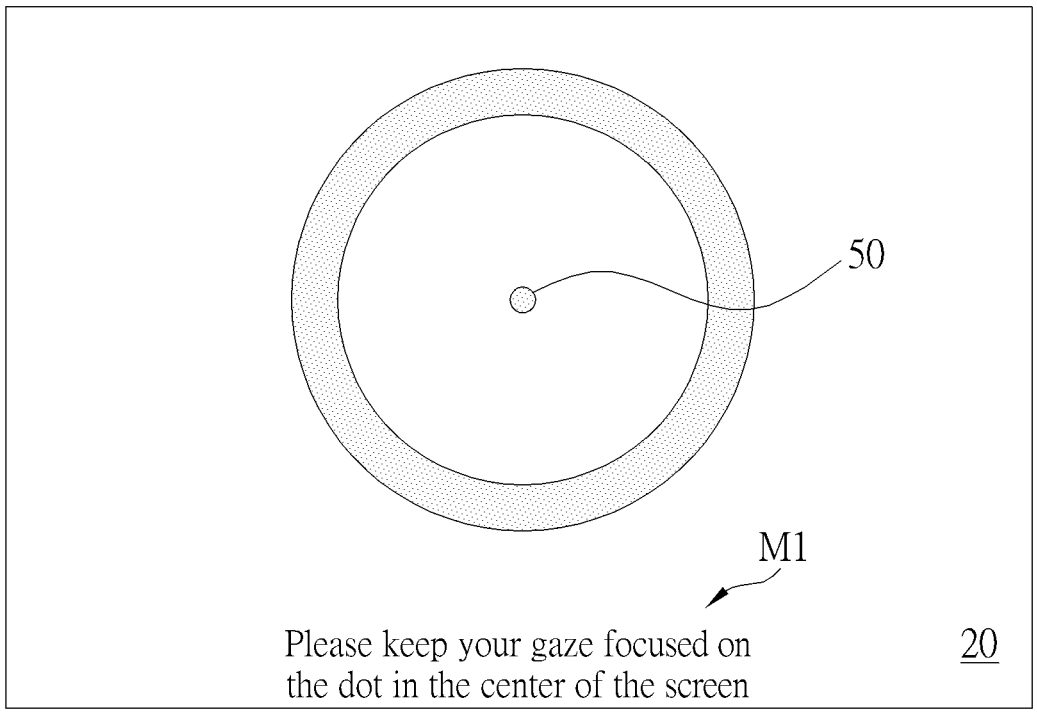
FIGS. 8A-8D are diagrams illustrating the operation of an eye-tracking module according to another embodiment of the present invention.
Figure 8B:
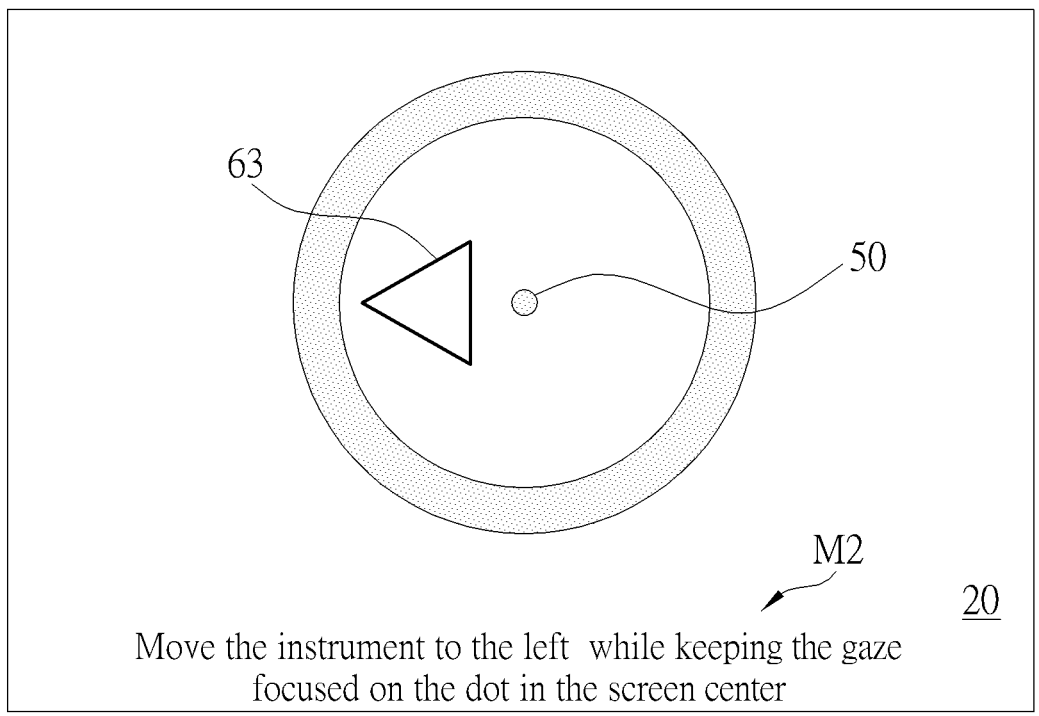
Figure 8C:
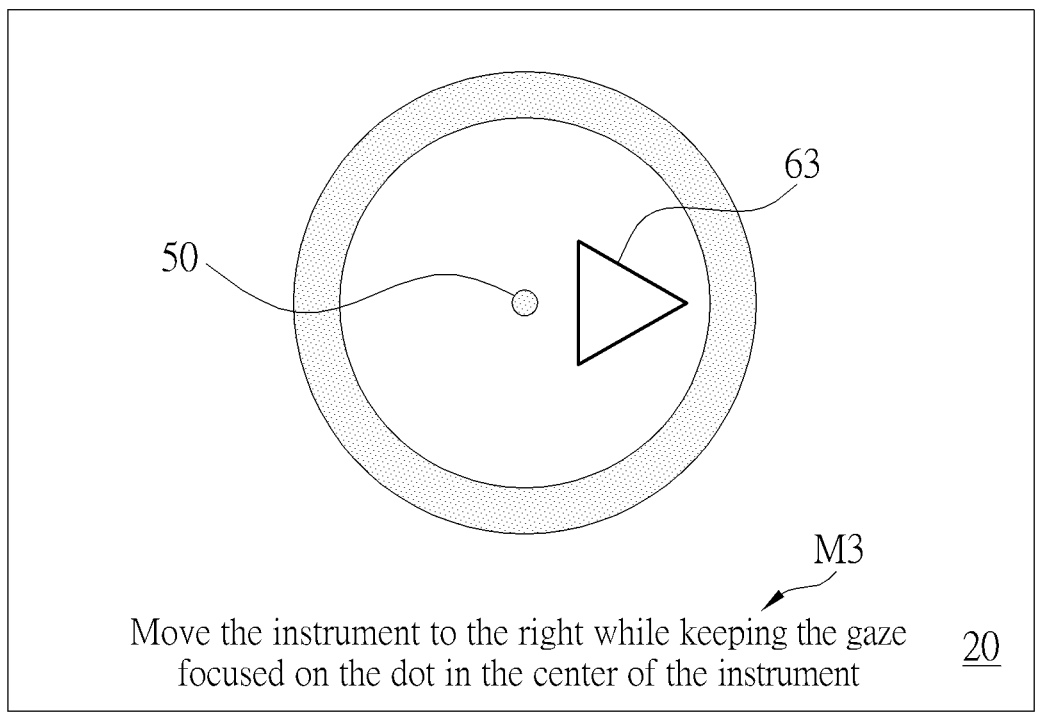
Figure 8D:
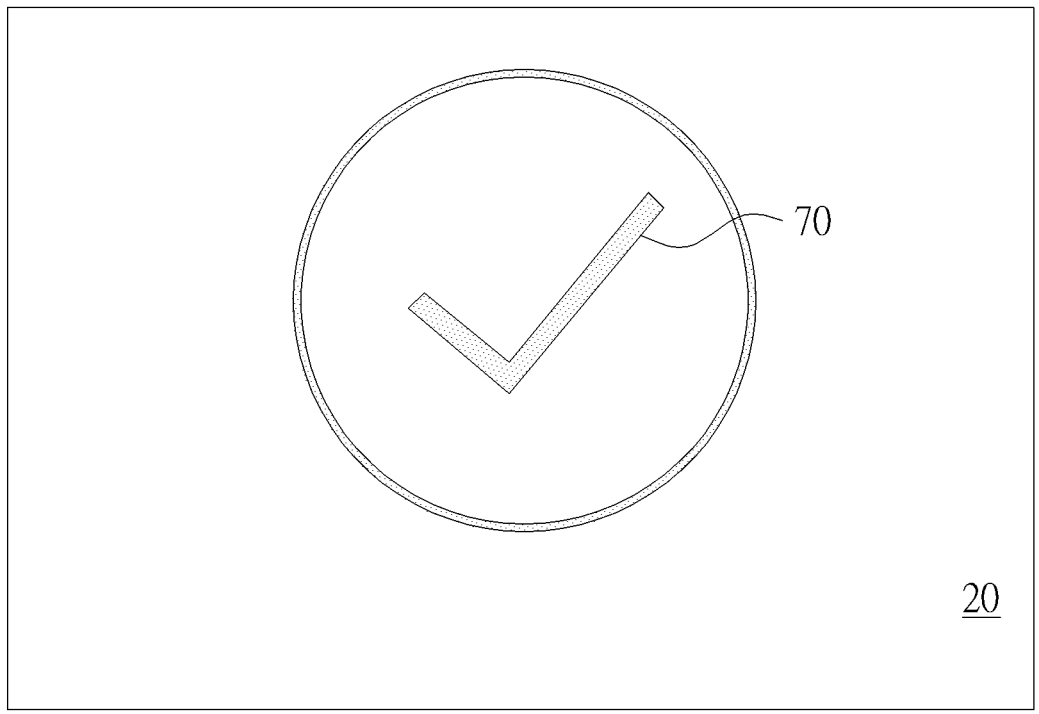

FIGS. 8A-8D are diagrams illustrating the operation of the eye-tracking module 10 when executing steps 720-740 according to an embodiment of the present invention. As depicted in FIG. 8A, a calibration mark 50 may be displayed on the center of the instrument 20, and a message M1 may be displayed on the instrument 20 for instructing the user to keep the gaze focused on the calibration mark 50. As depicted in FIGS. 8B and 8C, the movement message may be provided by displaying a dynamic image 63 associated with the moving direction of the instrument 20 around the calibration mark 50, and messages M2 and M3 may be displayed on the instrument 20 for instructing the user to move the instrument 20 in the direction as indicated by the dynamic image 63 while keeping the gaze focused on the calibration mark 50. As depicted in FIG. 8D, when the user has moved the instrument 20, an image 70 indicating the completion of the calibration procedure may be displayed on the instrument 20. In the embodiment depicted in FIGS. 8A-8F, the dynamic image 3 may include other directions such as the four cardinal and the four inter cardinal directions. However, the method of presenting or changing the dynamic image 63 does not limit the scope of the present invention.

In the embodiments depicted in FIGS. 8A-8D, the messages M1-M3, the dynamic image 63, and the image 70 indicating the completion of the calibration procedure are text or video messages on the instrument 20 which may be a screen of a VR/AR/MR headset, a tablet computer, a laptop computer or a smartphone. In these cases, the messages M1-M5, the dynamic image 63, the status information and the image 70 indicating the completion of the calibration procedure may also be presented acoustically by using a voice generator, which may be presented alone or accompanied with the visual information. In another embodiment when the instrument 20 is a display surface on which the calibration mark 50 may be printed or projected, the contents of the messages M1-M3, the dynamic image 63, and the completion of the calibration procedure may be acoustically presented, such as using a voice generator.

In steps 450 and 750, the eye-tracking module 10 may record visual information using the left-eye camera $CAM_L$, the right-eye camera $CAM_R$ when the user is moving the head or the instrument 20. In another embodiment, when the user is moving the head or the instrument 20, the visual information may be further record by using the scene camera $CAM_S$ and be transferred through the controller 30 to the eye-tracking module 10. Also, the processor 12 may be further configured to activate or deactivate the left-eye lighting device $LED_L$ and the right-eye lighting device $LED_R$ according to ambient luminance.

In steps 460 and 760, the processor 12 is configured to perform the calibration procedure according to the visual information recorded when the user is moving the head or the instrument 20. In the embodiment of implementing the eye-tracking module 10 on a head-mounted device (such as VR/AR/MR headset or smart glasses), the screen of the head-mounted device serving as the instrument 20 can use existing virtual coordinates and camera coordinates for presenting virtual images to the FoV of the user. Thus in steps 460 and 760, the processor 12 may perform the calibration procedure according to the ocular information recorded by the left-eye camera $CAM_L$ and the right-eye camera $CAM_R$ and existing virtual/camera coordinates when the user is moving the head or the instrument 20. In the embodiment of implementing the eye-tracking module 10 on any glass-type device, the processor 12 may perform the calibration procedure according to the ocular information recorded by the left-eye camera $CAM_L$ and the right-eye camera $CAM_R$ and the FoV information of the user recorded by the scene camera $CAM_S$ when the user is moving the head or the instrument 20.

In a prior art method of calibrating an eye-tracking application, the user is requested to gaze at different objects while keeping the head in a steady position. In the present method of calibrating an eye-tracking application, the user is requested to move the head or the instrument while keeping the gaze focused on the same spot. Since it is easier to keeping the gaze focused on the same spot than keeping the head steady for a long time, the present invention can improve the accuracy of the calibration procedure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of calibrating an eye-tracking application, comprising:
    displaying a calibration mark on an instrument and instructing a user to keep a gaze focused on the calibration mark;
    providing a movement message;
    instructing the user to move a head of the user or move the instrument as indicated by the movement message while keeping the gaze focused on the calibration mark;
    recording an ocular information of the user when the user is moving the head or the instrument;
    performing a procedure of calibrating the eye-tracking application according to the ocular information of the user; and
    displaying status information which indicates a current status of the procedure of calibrating the eye-tracking application.

2. The method of claim 1, further comprising:
    recording a field-of-view (FoV) information of the user when the user is moving the head of the user or moving the instrument; and
    calibrating the eye-tracking application according to the ocular information and the FoV information of the user.

3. The method of claim 2, wherein the FoV information is recorded using an scene camera embedded in a glass-type device with an eye tracking module, or is equal to existing virtual/camera coordinates provided by a virtual reality/augmented reality/mixed reality headset with an eye tracking module.

4. The method of claim 1, further comprising:
providing the movement message by displaying a dynamic image on the instrument around the calibration mark, wherein the dynamic image is changed according to a head movement of the user.

5. The method of claim 4, further comprising:
displaying a first region of the dynamic image on the screen using a first method and displaying a second region of the dynamic image on the screen using a second method when the user is moving the head, wherein:
the first method is different from the second method;
the first region corresponds a part of the head movement which the user has not performed; and
the second region corresponds to a part of the head movement which the user has already performed.

6. The method of claim 1, further comprising:
providing the movement message by displaying a dynamic image on the instrument around the calibration mark, wherein the dynamic image is changed according to a moving direction of the instrument.

7. The method of claim 6, further comprising:
displaying the dynamic image associated with a first moving direction on the instrument at a first point of time and instructing the user to move the instrument along the first moving direction while keeping the gaze focused on the calibration mark; and
displaying the dynamic image associated with a second moving direction on the instrument at a second point of time and instructing the user to move the instrument along the second moving direction while keeping the gaze focused on the calibration mark.

8. The method of claim 1, further comprising:
recording the ocular information of the user using a left-eye camera and a right-eye camera in an eye-tracking module when the user is moving the head or the instrument.

9. The method of claim 8, further comprising:
activating or deactivating a left-eye lighting device and a right-eye lighting device in an eye-tracking module according to an ambient luminance of the eye-tracking module when recording the ocular information of the user.

10. The method of claim 1, further comprising:
providing the movement message by displaying one or multiple text images associated with a head movement of the user or a moving direction of the instrument on the instrument around the calibration mark, or by playing one or multiple audio messages associated with a head movement of the user or the moving direction of the instrument.

11. An optical system, comprising:
an instrument on which a calibration mark is displayed;
an eye-tracking module comprising:
at least one left-eye camera and at least one right-eye camera configured to record an ocular information of a user; and
a processor configured to:
instruct the at least one left-eye camera and the least one right-eye camera to record an ocular information of the user when the user is moving a head of the user or the instrument; and
perform a procedure of calibrating an eye-tracking application according to the ocular information of the user; and
a controller configured to control the procedure of calibrating the eye-tracking application by:
instructing the user to keep a gaze focused on the calibration mark;
providing a movement message; and
instructing the user to move the head or move the instrument as indicated by the movement message while keeping the gaze focused on the calibration mark; and
instructing the instrument to display status information which indicates a current status of the procedure of calibrating the eye-tracking application.

12. The optical system of claim 11, wherein the instrument is a screen of a virtual reality/augmented reality/mixed reality headset, a screen of a display device or a cardboard.

13. The optical system of claim 11, wherein the controller is a process unit embedded in a virtual reality/augmented reality/mixed reality headset, a process unit of a glass-type device or a process unit embedded in a computing device.

14. The optical system of claim 11, wherein the movement message is displayed on the instrument as a dynamic image which is changed according to a head movement of the user or according to a moving direction of the instrument.

15. The optical system of claim 11, further comprising:
a voice generator configured to play the movement message acoustically.

16. The optical system of claim 11, further comprising:
at least one scene camera configured to record an FoV information of the user when the user is moving the head of the user or moving the instrument.

17. The optical system of claim 16, wherein:
the scene camera is a camera embedded in a head-mounted display device or a glass-type device;
the controller is further configured to:
instruct the at least one scene camera to record an FoV information of the user when the user is moving a head of the user or the instrument; and
transfer the visual information record by the scene camera to the eye-tracking module;
the processor within the eye-tracking module is further configured to:
receive the FoV information of the user recorded by the scene camera; and
calibrate the eye-tracking application according to the ocular information and the FoV information of the user.

18. The optical system of claim 11, wherein:
the instrument is a screen of a virtual reality/augmented reality/mixed reality headset; and
the processor is further configured to:
receive an FoV information of the user based on existing virtual coordinates or camera coordinates adopted by the virtual reality/augmented reality/mixed reality headset; and
calibrate the eye-tracking application according to the ocular information and the FoV information of the user.

* * * * *